（12） United States Patent
Kita (10) Patent No.: US 7,457,480 B2
(45) Date of Patent: Nov. 25, 2008

(54) BRIGHT LINE PLOT PROCESSING METHOD AND COMPUTER PROGRAM PRODUCT FOR BRIGHT LINE PLOT PROCESSING

(75) Inventor: Koji Kita, Wakayama (JP)

(73) Assignee: Noritsu Koki Co., Ltd., Wakayama (JP)

( * ) Notice: Subject to any disclaimer, the term of this patent is extended or adjusted under 35 U.S.C. 154(b) by 588 days.

(21) Appl. No.: 10/943,915

(22) Filed: Sep. 20, 2004

(65) Prior Publication Data
US 2005/0063604 A1 Mar. 24, 2005

(30) Foreign Application Priority Data
Sep. 19, 2003 (JP) ............................. 2003-328019

(51) Int. Cl.
G06K 9/20 (2006.01)
(52) U.S. Cl. ........................ 382/282; 382/100; 382/104; 382/181; 382/275
(58) Field of Classification Search ................ 382/282, 382/173–180
See application file for complete search history.

(56) References Cited

U.S. PATENT DOCUMENTS 5,134,661 A * 7/1992 Reinsch ........................ 382/100
5,361,763 A * 11/1994 Kao et al. .................... 600/410
5,835,614 A * 11/1998 Aoyama et al. .............. 382/104
2003/0012452 A1 * 1/2003 Trifonov et al. ............. 382/275
2004/0037462 A1 * 2/2004 Lewis et al. ................. 382/181

FOREIGN PATENT DOCUMENTS

| JP | 6-030373 A | 2/1994 |
|----|------------|--------|
| JP | 11308474 A | 11/1999 |
| JP | 2001-155149 A | 6/2001 |
| JP | 2003-058880 A | 2/2003 |

* cited by examiner

Primary Examiner—Brian Quang Le
Assistant Examiner—Tsung-Yin Tsai
(74) Attorney, Agent, or Firm—Smith Patent Office (57) ABSTRACT

A method of plotting a bright line which starts from the pixel at a bright point in an image where a more natural mode of a cross filter effect can be applied to any digital photographic image. The bright line plot processing method includes steps of generating an image of the bright line using a predetermined bright line definition format; generating data of the pixel at the bright point; generating data of each pixel for the bright line from the pixel data produced by attenuating the data of the pixel at the bright point at a predetermined attenuation rate along the lengthwise and/or widthwise direction of the bright line and the pixel data of the image to be processed; and plotting the data of the pixels for the bright line on the image to be processed.

10 Claims, 9 Drawing Sheets
(2 of 9 Drawing Sheet(s) Filed in Color)

BRIGHT LINE PLOT PROCESSING METHOD AND COMPUTER PROGRAM PRODUCT FOR BRIGHT LINE PLOT PROCESSING

BACKGROUND OF THE INVENTION

1. Field of the Invention

The present invention relates to a bright line plot processing method of subjecting a digital image, which is produced by a digital camera or a scanner reading a photographic film or the like, to the cross filtering effect processing which is one of spectacular effects and to a computer program product for carrying out the bright line plot processing method.

2. Description of the Related Art

A cross filter is one type of various spectacular effect filters used with a camera lens unit and implemented by a transparent optic filter with several slits provided in a surface. With the cross filter mounted to a silver halide photographic camera, a resultant photo has a luminous effect where a radial form of bright lines emit from the highlight on a subject to be shot.

The same effect may be obtained with a digital camera using such an optical cross filter. However, the imaging device in the digital camera is smaller in the light receiving area than the film size of a silver halide camera. Accordingly, as the digital camera employs a wide-view lens which is short in the focusing distance and long in the depth of view, it may record the slits in the cross filter when used.

In view of the above aspect, an image processing method is introduced for extracting highlight locations from the image produced by a digital camera and plotting the bright lines extending from each of the highlight locations. The imaging device or CCD in the digital camera is as low as 7 EV in the dynamic range to exposure light as compared with the conventional silver halide cameras. As a common image contains a difference in the luminance greater than the dynamic range, it may develop luminance saturated regions. It is hence difficult to extract the highlight on the subject at a considerable degree of accuracy.

For compensation, a modified digital camera is proposed as disclosed in Japanese Unexamined Patent Publication No. (Heisei)6-30373 which includes a read-in controlling means for, when the subject to be shot has been recorded at an optimum exposure level in a recording medium, reading the subject with its exposure level controlled to be declined by a predetermined step from the optimum exposure level and a record controlling means for detecting each location on the subject read by the read-in controlling means where the luminance is higher than a reference level and recording data of the location on the subject in a given area of the recording medium.

It is still disadvantageous that the optical cross filter on the silver halide camera has to pass a series of trial shooting actions for proving the spectacular effect desired and also its actions require a sort of skill as are not easily conducted by an ordinary personnel. Moreover, the process of eliminating from the image unwanted bright lines which have been recorded at the shooting is a highly intricate task.

It is more practical and functional for producing a cross filter effect to employ an image processing method of detecting a cluster of pixels or bright points in an image which are higher in the luminance than a threshold level and plotting the bright line along the contour of the pixel cluster. However, the bright line is substantially linear and may be a chain of white or luminous color. Accordingly, when enlarged in size, the bright line appears in a zigzag form or not properly chained form. It is thus desired to modify the image processing method for producing an improvement of the cross filter effect. Such a modified image processing method may be applied to any type of digital camera which employs none of the foregoing function disclosed in the above Publication.

SUMMARY OF THE INVENTION

In view of the above described drawbacks, the object of the present invention is to provide the bright line plot processing method and the computer program product for conducting the bright line plot processing where a more natural mode of the cross filter effect can be applied to the digital images shot by the digital camera or read by the scanner scanning the photographic film.

For achievement of the object of the present invention, the bright line plot processing method of plotting the blight line which starts from the pixel at a bright point in an image to be processed comprises: a first bright line plotting step for generating an image of the bright line using a predetermined bright line definition format; a second bright line plotting step for generating data of the pixel at the bright point; a third bright line plotting step of generating data of each pixel for the bright line from the pixel data produced by attenuating the data of the pixel at the bright point at a predetermined attenuation rate along the lengthwise and/or widthwise direction of the bright line and the pixel data of the image to be processed; and a fourth bright line plotting step of plotting the data of the pixels for the bright line on the image to be processed.

Also, the bright line definition format may preferably involve an oval form which extends from one end of the long axis while the first processing step includes an input step of entering data for defining the bright line including the long and short axes of the oval, the number of the bright lines, and angle of starting the bright line.

Moreover, the third bright line plotting step may, when the pixel data of the image to be processed has been produced as the data of the pixels for another bright line, preferably utilize the data of the pixels as the pixel data of the image to be processed.

Other features of the present invention will be apparent from the following description referring to embodiments.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION OF THE PREFERRED EMBODIMENTS

A bright line plot processing method, a computer program product for carrying out the bright line plot processing method, and an image processing apparatus in which the computer program product is installed according to the present invention will be described in more detail.

Figure 1:
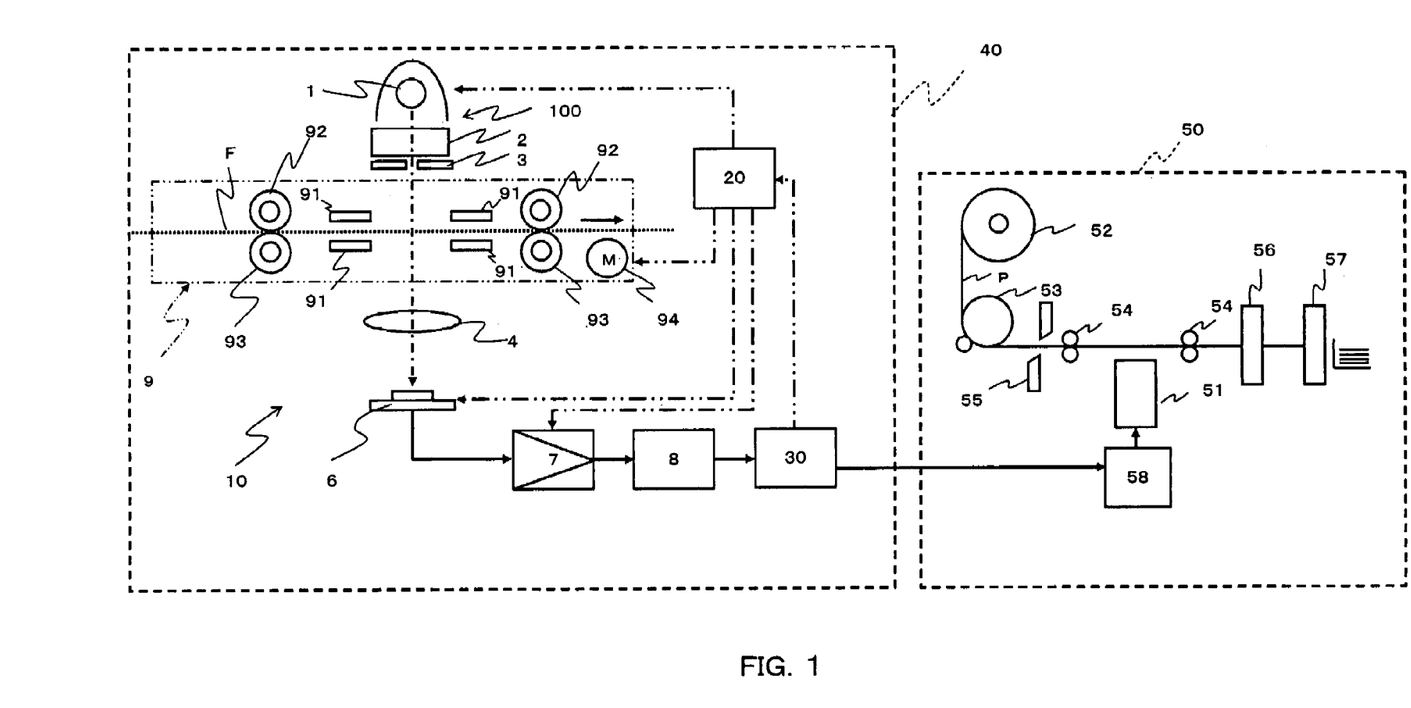
FIG. 1 is a block diagram showing an entire arrangement of an image processor (a photograph processor)

The image processing apparatus according to the present invention is embodied in the form of a photograph processing apparatus which comprises, as shown in FIG. 1, a scanner 10 for optoelectrically reading data of an image recorded on a film, a scanner controller 20 for controlling the action of the scanner 10 for image input, a film image input unit 40 equipped with an image processor 30 for processing the image data read by the scanner 10 with the use of a given algorithm to produce an image data output, and an image output unit 50 for exposing a sheet of printing paper to a projection of the image data output received from the film image input unit 40 and subjecting the sheet on which the image is printed to the developing process to produce a photographic print.

The image output unit 50 comprises a magazine 52 in which a roll of printing paper P is stored, advancing rollers 53 and exposure conveying rollers 54 aligned for conveying the printing paper P from the magazine 52 along a conveying path, a cutter 55 disposed across the conveying path for cutting the printing paper P into sheets of a desired size, an exposure engine 51 disposed across the conveying path for exposing the sheets of the printing paper P to a pattern of laser beam produced in pixels according to the image data received and processed by the film image input unit 40, a developer 56 for subjecting the exposed printing paper P to the developing process, a dryer 57 for drying the developed printing paper P, and a controller 58 for controlling the action of each functional stage illustrated by a block.

More specifically, the scanner 10 comprises a light source 100 for emitting a beam of light for reading an image on a film, which includes a halogen lamp 1, a mirror tunnel 2 for dispersing a flux of light emitted from the halogen lamp 1, and a slit 3 for converting the dispersed light into a slit of light oriented along the direction of a short width of the film F, a focusing lens unit 4 for focusing the slit of light emitted from the slit 3 and passed through the film F, a linear CCD sensor 6 equipped with three light receivers for receiving and reading three, R(red), G(green), and B(blue), color components of the focused light of the image respectively, an amplifying circuit 7 for amplifying a signal output of the linear CCD sensor 6, an A/D converter 8 for sampling and holding a signal output of the amplifying circuit 7 for quantization, and a film carrier 9 for automatically conveying the film.

The film carrier 9 comprises a pair of upper and lower conveying rollers 92 and 93 for conveying the negative film F of APS (Advanced Photo System) or 35-mm standard in a direction denoted by the arrow, a pulse motor 94 for driving the conveying rollers 92 and 93, and a negative film mask 91 for determining the position of the film F.

The scanner controller 20 consists mainly of a CPU for controlling the action of turning on and off the light source 1, the intensity of emitted light, the action of the solid-state imaging device 6, the gain and offset in the amplifying circuit 7, and the action of the film carrier 9 for conveying the film F, ROMs for storing programs for the actions, and RAMs for storing data of the controlling action. Its controlling action determines that the scanning action of the linear CCD sensor 6 reading an image on the film F along the scanning direction with its three R, G, and B light receivers aligned in a row widthwisely of the film F, the action of the film carrier 9 for conveying the film F at a right angle to the alignment of the three light receivers, and the turning on and off of the light source 1.

The action of reading all the images recorded in frames of the film F comprises two steps of pre-scanning to read the images at a low resolution level under the predetermined scanning conditions and main-scanning to read the image areas in the frames at a high resolution level under modified scanning conditions which are determined in response to data of the images recorded by the pre-scanning step.

The image processor 30 consists mainly of a CPU for processing data of the images read by the scanner 10, ROMs for storing the programs for carrying out the image processing, RAMs for storing the data of the images, and other peripheral components. Each step of the action illustrated by a block will now be explained.

Figure 2:
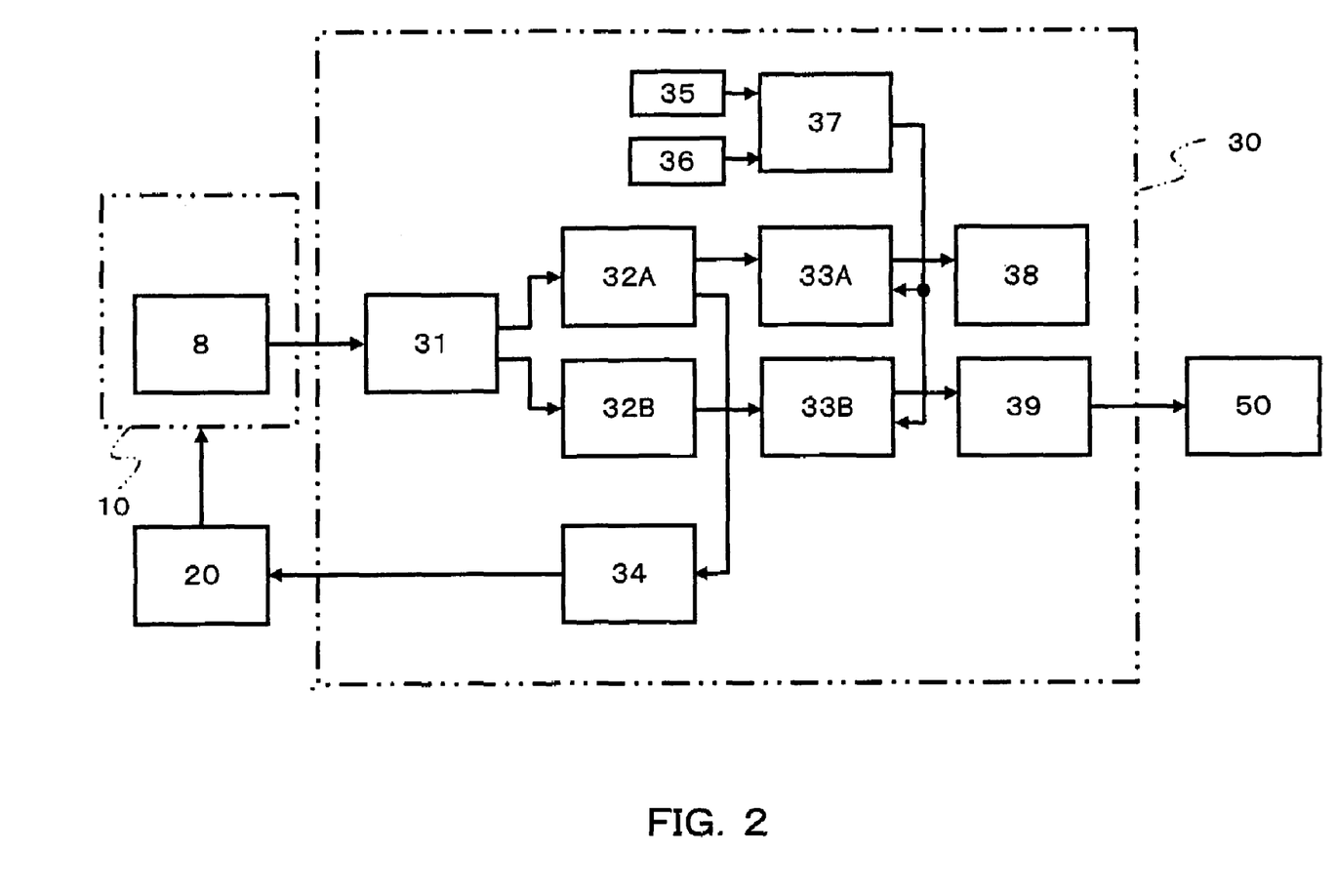
FIG. 2 is a block diagram of an image processing unit.

As shown in FIG. 2, the image processor 30 comprises an input image processor 31 for subjecting the R, G, and B components of each image data received from the scanner 10 to shading correction or the like, a pre-scanned image memory 32A for storing data of the images read by the pre-scanning action of the input image processor 31, a main-scanned image memory 32B for storing data of the images read by the main-scanning action of the input image processor 31, a reading condition determining unit 34 for determining the reading conditions for the pre-scanning and main-scanning action of the scanner 10, which include the resolution level and the gain and offset used in the amplifying circuit 7, a display 38 for displaying the images stored in the pre-scanned image memory 32A, a keyboard 35 and a mouse 36 for entering the image processing conditions for correcting the frame including color balance, color saturation, gradation, concentration, and enlargement and the printing conditions including the number of prints, an image processing condition determining unit 37 for determining the image processing conditions for the image at each frame, an image conversion processing unit 33A for processing data of the pre-scanned image under the conditions determined by the image processing condition determining unit 37, an image conversion processing unit 33B for processing data of the main-scanned image, and an output image processing unit 39 for converting the main-scanned image processed by the image conversion processing unit 33B into a form suited for use in the image output unit 50.

The bright line plot processing program according to the present invention is stored in the ROM of the above image processor 30 and used in response to a command from the CPU for conducting the processing action of the image conversion processing unit 33.

Figure 3:
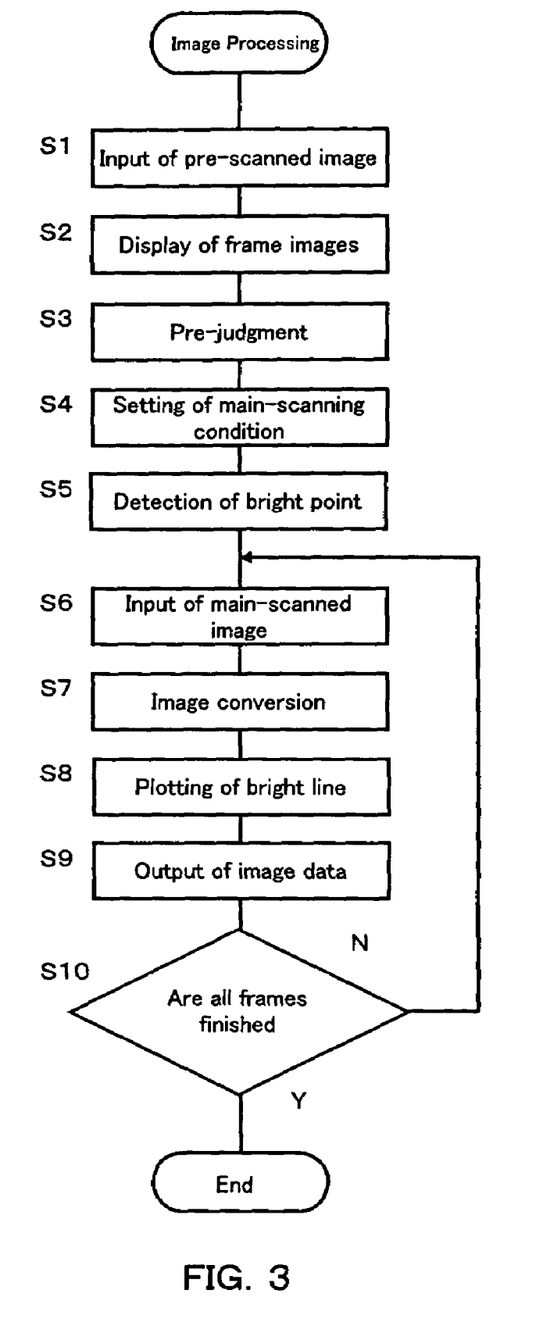
FIG. 3 is a flowchart showing a procedure of photographic image processing.

The image processing action of the image processor 30 will be described referring to the flowchart of FIG. 3. The action starts with the pre-scanned images at a low resolution level received from the scanner 10, subjected to the shading correction or the like, and saved in the pre-scanned image memory 32A (Step S1). Each frame data is separated by the image conversion processing unit 33A from the pre-scanned image data saved in the pre-scanned image memory 32A, subjected to data thinning, and displayed together in the predetermined size with other frames on the display 38 (S2).

This is followed by an action of pre-judging or determining the image processing conditions in the image processing condition determining unit 37 in response to an input data entered by an operator viewing the display 38 and operating the keyboard 35 and/or the mouse 36 before saving the same (S3).

The pre-judging action includes a series of steps of manually correcting the image data of each frame which may have a color inferior since it has automatically been modified with an average of tone throughout all the frames of the film. More particularly, the image processing conditions for correcting the frame including color balance, color saturation, gradation, concentration, and enlargement are determined and entered. The image data of each frame is processed under the image processing conditions by the image conversion processing unit 33A and then displayed on the display 38 as can be viewed by the operator as a final image of quality to be printed.

When the pre-judging action has been completed, the cross filtering process for producing the cross filter effect is selectively initiated by the entry action of the mouse 36 to start a step of detecting the bright points in each frame which will be explained later in more detail. The bright points in each frame of the pre-scanned image of interest are detected and saved in the image processing condition determining unit 37 (S5).

Then, the image input controller 20 starts the main-scanning action of reading the image data in each frame under the reading conditions determined by the reading condition determining unit 40 which include the resolution level at the linear CCD sensor 6 and the gain in the amplifying circuit 6. The image data is subjected to the shading correction or the like and saved in the main-scanned image memory 32B (S6).

Upon retrieved from the memory 32B by the image conversion processing unit 33B, the image data is processed under the image processing conditions determined by the image processing condition determining unit 37 (S7), subjected to the bright line plot processing based on the bright points determined at Step S5 (S8), and converted by the output image processing unit 39 into a form suited for use in the image output unit 50 (S9). When all the frames of the film have been read, processed, and received by the image output unit 50, the procedure of the flowchart is terminated (S10).

Figure 4:
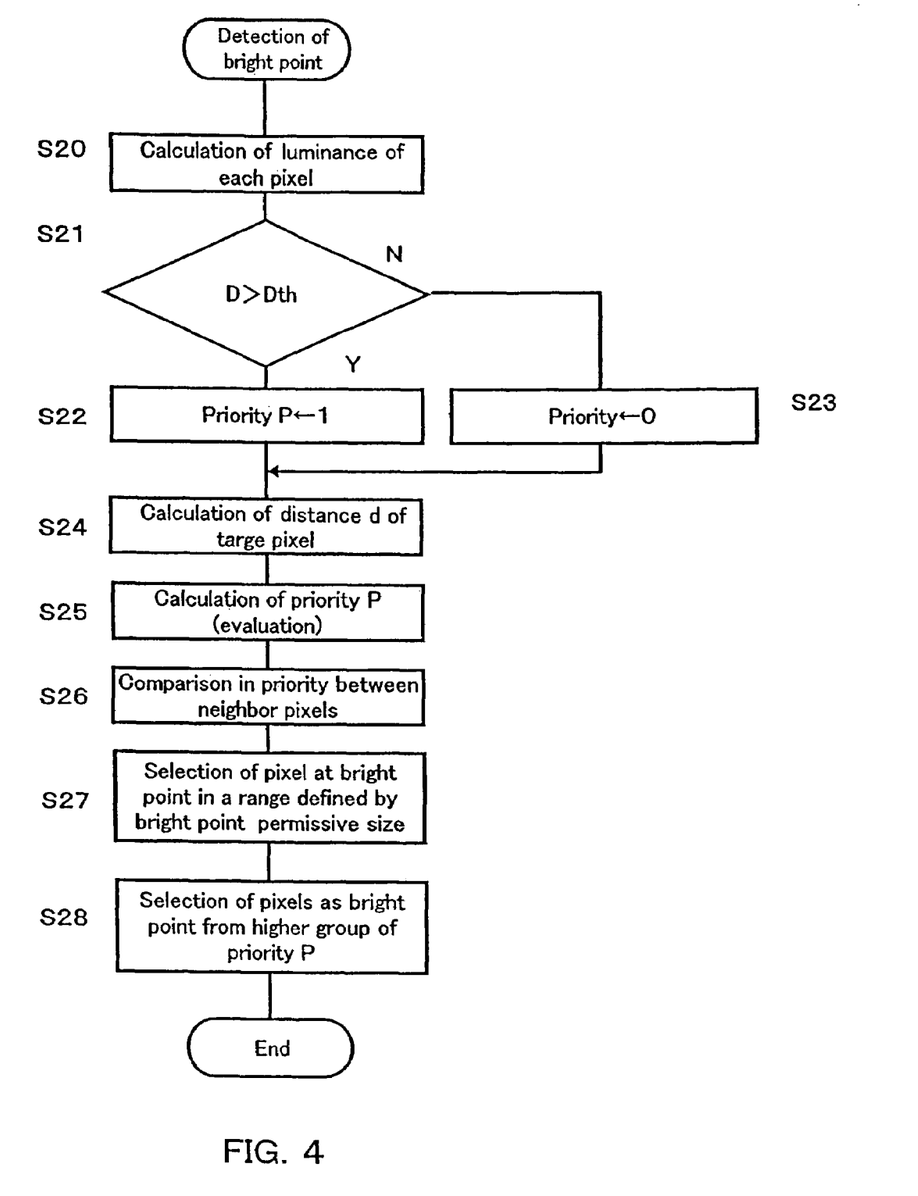
FIG. 4 is a flowchart showing a procedure of detecting the bright point.

The action of detecting the bright points will now be explained referring to the flowchart of FIG. 4. The image conversion processing unit 33A for conducting the action of detecting the bright points which is carried out by the program stored in the ROM as commanded by the CPU comprises a first processing means for selectively determining a cluster of pixels in the image which are higher in the luminance than a given threshold, a second processing means for carrying out in plural directions a counting action of counting the number of selected pixels which are continuous from one target pixel in the cluster of the pixels determined by the first processing means and selectively determining a target group of the selected pixels which extend not to the edge of the image and of which the counted number is not greater than that of the pixels in a bright-point permissive size, a third processing means for calculating an evaluation value of each pixel in the target group selectively determined by the second processing means from the counted number using an evaluation function and identifying the center pixel in the target group from the evaluation value, and a fourth processing means for selectively determining as a pixel at the bright point one of the center pixels, which is highest in the evaluation value, in the bright-point permissive sizes identified by the third processing means.

Figure 5A:
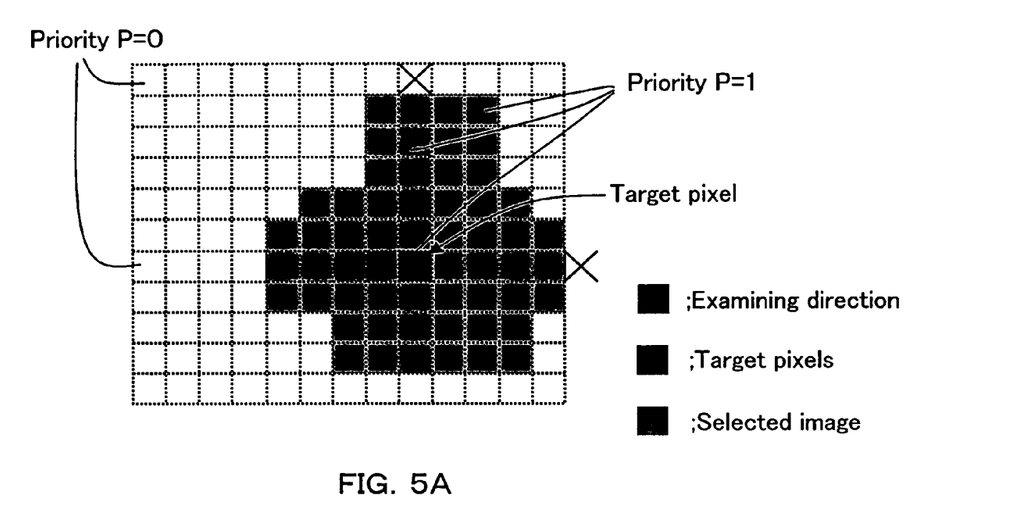
FIG. 5A is an explanatory view of a second layer.
Figure 5B:
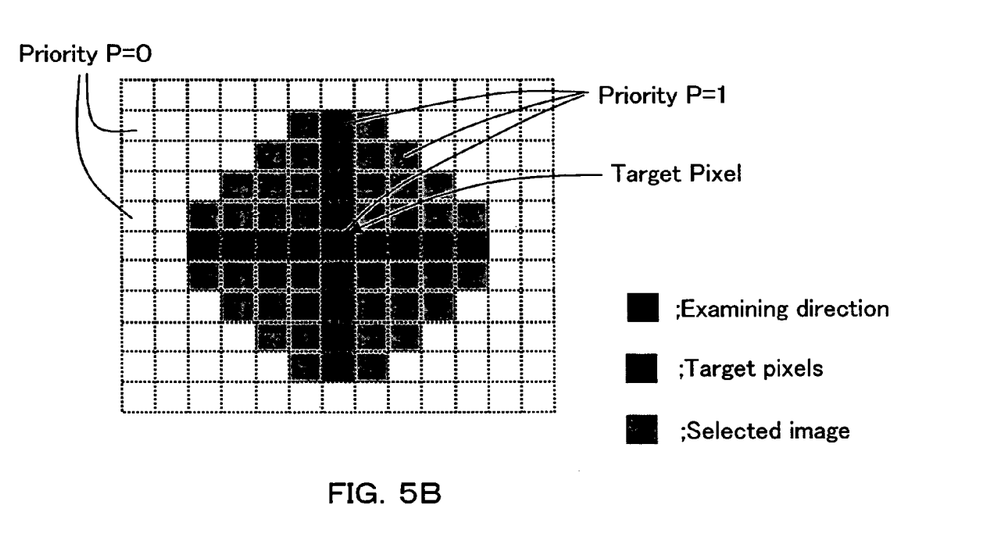
FIG. 5B is an explanatory view of a second layer.

The above action will be explained in more detail. The pre-scanned image memory 32A comprises a first layer where the pre-scanned images are stored and a second layer which is identical in the size to the first layer and carries no data. The first processing means calculates the luminance (density level) Dx,y of each pixel in the image data stored in the first layer using Equation 1 (S20), selectively determines as a candidate of the bright point the pixel of which the luminance is higher than a predetermined threshold Dth (S21), assigns the priority Px,y=1, which is a reference value for evaluation of a pixel, to the location in the second layer corresponding to the pixel selectively determined (S22), and designates the pixel of which the luminance is not higher than the threshold with the priority Px,y=0 (S23). This allows the pixel at the priority of 1 in the second layer to be the selected pixel at the initial stage. The threshold may arbitrarily be determined depending on the type of the image to be processed. Examples of the selected pixel in the second layer are shown in FIGS. 5A and 5B.

$$D_{x,y} = (B_{x,y} + G_{x,y} + R_{x,y})/3 \qquad \text{(Equation 1)}$$

where x and y represents a coordinate of the pixel and Bx,y, Gx,y, and Rx,y are three, blue, green, and red, color components in the coordinate (x,y).

The second processing means selectively determines one of the pixels which are at the priority of 1 in the second layer as the target pixel and counts the number of the pixels which extend from the target pixel in the four, upper, lower, leftward, and rightward, directions. Then, the distance d[n] is calculated from the number of the pixels (where n represents the direction, 0 in the positive (upper) direction along the y axis, 1 in the negative (lower) direction along the y axis, 2 in the negative (leftward) direction along the x axis, and 3 in the positive (rightward) direction along the x axis) (S24). The number of the pixels may be counted along oblique directions other than the four, upper, lower, leftward, and rightward, directions.

This is followed by examining all the target pixels to determine the target pixel of which each row of the pixels extends not to the edge of the image and the number of the entire pixels of the cluster is not higher than that of the bright-point permissive size R of the pixels. When the row of the pixels extends to the edge of the image, the distance d[n] is calculated as a negative of the number of the pixels of the row.

The bright-point permissive size R is equal to the number of the pixels in a smaller row extending from the target pixel along the vertical or horizontal within the image, e.g., the number of the pixels at the bright point permissive rate Cp in relation to the total number Y in the vertical row, as defined by Equation 2. The bright-point permissive size R is based on the criteria of judgment that a greater cluster of the pixels represents not the bright point but a bright object (for example, a white wall). In this embodiment, the bright point permissive rate Cp is set to, but not limited to, 50%.

The negative of the number of the pixels of which the row extend to the edge of the image is designated because the pixels in the row are no more calculated and their cluster can hardly be determined in the size. As the cluster of the pixels is eliminated from the examination, this process may be unnecessary. The target pixel adjacent to the edge of the image can be omitted from the calculation as having been judged that it gives a minimum of the effect.

$$R = \min\left(\frac{Y \times Cp/1000}{2}, 126\right) \quad \text{(Equation 2)}$$

The division by 2 in Equation 2 means that the sum of a pair of two lengths of the bright line extending from the bright point in opposite, upper and lower or rightward and leftward, directions is within Cp %. The half of the bright line from upper to lower or leftward to rightward be regarded as a limit of the examination, hence defining the bright-point permissive size of the pixels.

As the calculation incorporates an 8-bit process, the limit of the examination is set to 126 in the image of which any row of the pixels is too large (for example, 5040 pixels or more at Cp=50). When the count reaches the limit, the distance d[n] is set simply to 127 for ease of the calculation. However, the setting is not of limitation (as equally applicable to each of the following calculations). For example, whence=50 and the bright-point permissive size R of the pixels being 6 in a cluster shown in FIG. 5A, established are d[0]=127, d[1]=4, d[2]=5, and d[3]=−5. In a cluster shown in FIG. 5B, d[0]=d[1]=d[2]=d[3]=5 is established. The target pixel in FIG. 5B is then selected.

The third processing means calculates the priority Px,y as an evaluation from the target pixel selectively determined by the second processing means, using the evaluation function denoted by Equation 3 (S25) and identifies the center pixel from the priority.

$$\text{sum} = \sum_{n=0}^{3} d[n] \quad \text{(Equation 3)}$$

$$avr = \text{sum}/4$$

$$\text{if } (d[n] > avr)\text{then}(wgt_n = avr/d[n]),$$

$$\text{else}(wgt_n = d[n]/avr)$$

$$Px, y = 126(avr/R) \prod_{n=0}^{3} wgt_n$$

More specifically, the evaluation function normalizes the number of the pixels or distance [d], which has been determined along plural directions on the selected target pixel, with a weighted average avr of the distances and releases its multiplication as the evaluation Px,y. Px,y is then assigned to the pixel in the second layer. The term (avr/R) in the equation is employed for normalization regardless of the size of the cluster about the target pixel. The maximum of (avr/R) is 1.

The term (avr/R) may be omitted if desired. If omitted, the pixel at the priority Px,y ranging from 1 to 126 in the second layer is identified as the target pixel while the pixels at 0, 127, or any negative number are eliminated from the examination of the bright point The evaluation of the pixel calculated by the above manner is higher when the cluster of the pixels about the target pixel determined by the second processing means is close to a true circle. In other words, the pixels at the center of the cluster where the selected pixels are continuously aligned are judged at higher evaluation levels. Through comparison between the pixels at the higher evaluations, the center pixel can easily be determined in the cluster of bright point candidate pixels.

Also, a target 3×3 pixel area is examined whether or not any neighbor pixel about the center pixel is higher in the priority Px,y than the center pixel. When so, the priority Px,y of the center pixel is turned to its negative (by multiplying −1) as denoted by Equation 4. This action is repeated throughout the target pixels (S26). More particularly, the target pixel at the highest priority among the neighbor pixels is determined as the center pixel at the bright point. This permits the evaluation of the degree of the circle of the pixels as well as of the size of the cluster.

$$\text{if}(Px,y < |Px+i,y+j|)\text{then}(Px,y \leftarrow Px,y \times (-1)) \quad \text{(Equation 4)}$$

where i,j=−1~1. The absolute value is provided for referring the pixel at the priority turned to a negative value.

The fourth processing means selectively determines as the pixel at the bright point the center pixel at the highest of the priority Px,y among the center pixels, which have been determined by the third processing means, in two or more clusters in a region defined by the bright point permissive size R. The region is sized in 2R×2R. In the region, when the priority Px+i,y+j of the neighbor pixels is smaller than the priority Px,y of the center pixel, they are turned to negative values as denoted by Equation 5. More particularly, the center pixels are examined by their level of the priority Px,y while the neighbor pixels remain not accounted (S27).

$$\text{if}(Px+i,y+j < |Px,y| \text{and} Px+i,y+j > 0)$$

$$\text{then}(Px+i,y+j \leftarrow Px+i,y+j \times (-1)) \quad \text{(Equation 5)}$$

where i,j=−R~R.

As described above, the pixel at the bright point is selectively determined through a series of the steps. In this embodiment, a desired number Cn, determined by the operator, of the pixels at the highest levels of the priority Px,y is selected (S28). This step prevents any bias in the profile of the bright points by, when the Cn is 5 as determined by the operator and the profile of the pixels contains 10 points at the highest levels of the priority, selecting 10 but not 5 of the pixels at the priority equal to the Cn-th highest level of the pixel.

More particularly, as the image processing is executed from one edge, the extraction of five samples involves a half of the bright points or a half of the image and such not spontaneous action has to be avoided. Once the entirety of the image has been scanned, the action will follow the predetermined number after selection of the bright points at the highest of the priority.

Output parameters including the number of the bright points and the luminance of each bright point calculated by Equation 1 are determined from the final pixels at the bright point (xc,xy) and saved as data of the bright points in the image processing condition determining unit 37. The luminance of each bright point is applicable to the bright line which extends from the bright point.

Figure 6:
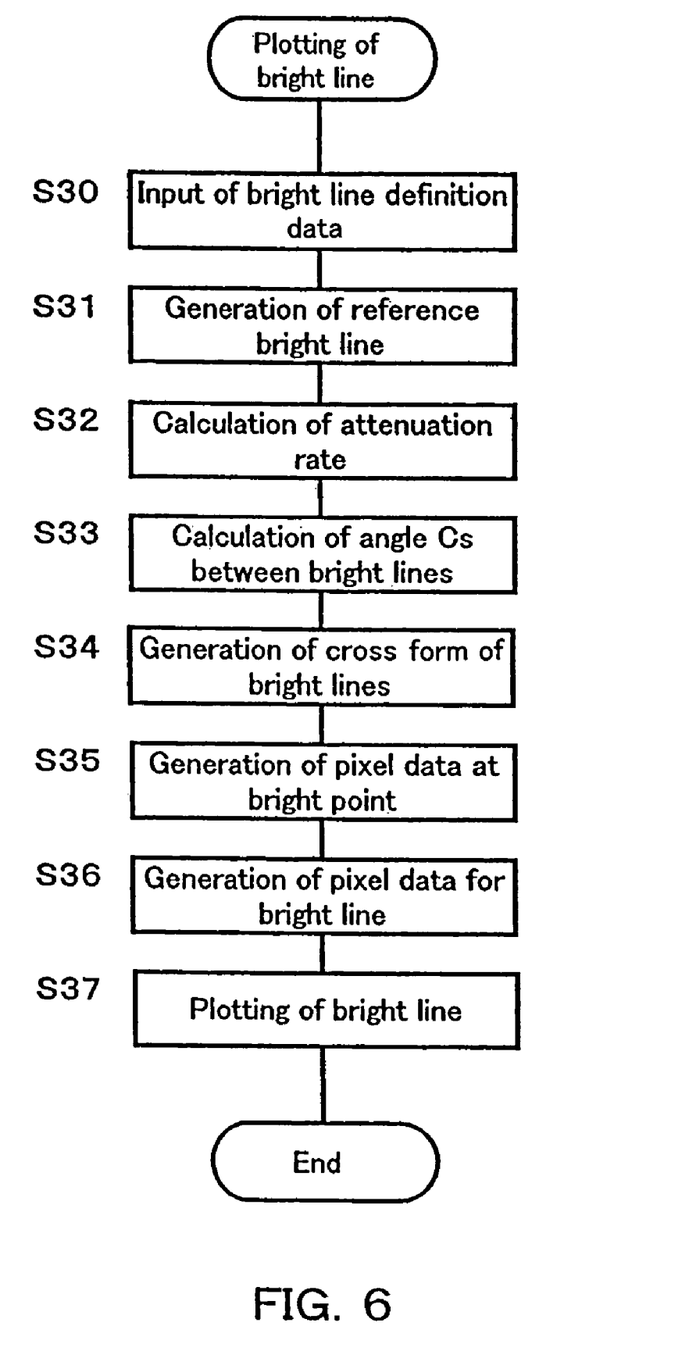
FIG. 6 is a flowchart showing a procedure of plotting the bright line.

Then, the action of plotting the bright line from the pixel at the bright point in relation to the pixels stored in the main-scanned image memory 32B will now be explained referring to the flowchart of FIG. 6.

The image conversion processing unit 33B as a bright line plot processing means for conducting the action of plotting the bright line with the CPU controlled by a program stored in the ROM comprises a first bright line plot processing means for generating an image of the bright line, which extends from the pixel at the bright point, with the use of a predetermined bright line definition format, a second bright line plot processing means for producing data of the pixel at each bright point in the bright line image, a third bright line plot processing means for generating data of the pixels for the bright line from the pixel data, which has been produced by attenuating the data of the pixel at the bright point at a predetermined attenuation rate along the lengthwise and widthwise directions of the bright line, and the pixel data of the image to be processed, and a fourth bright line plot processing means for plotting the data of the bright line on the image to be processed.

The first bright line plot processing means employs an oval format expressed by Equation 6 as the bright line definition format and generates the image of the bright line from the bright line definition data including the long and short axis lengths of an oval to be used, the number of the bright lines, and the angle of starting the bright line which may preferably be entered through the keyboard 35 (S30).

Figure 7A:
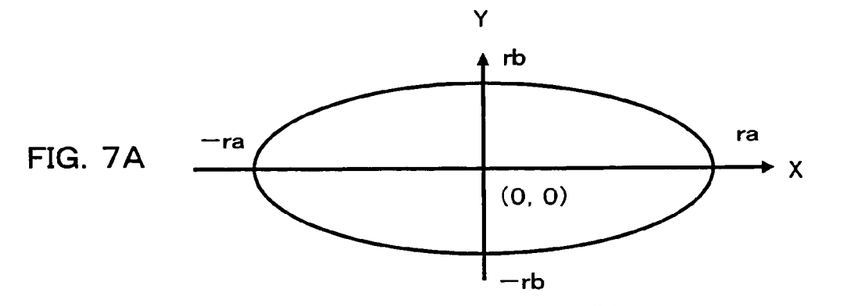
FIG. 7A is an explanatory view of generating a bright line.

The oval format expressed by Equation 6 where the oval has a center at the origin of an XY coordinate with its long axis extending between x=ra and x=−ra and its short axis extending between y=rb and y=−rb as shown in FIG. 7A is shifted to a form denoted by Equation 7. Assuming that a is 1 and the long and short axes are controlled with r and b respectively, the oval is expressed by Equation 8.

$$r^2 = \left(\frac{x^2}{a^2}\right) + \left(\frac{y^2}{b^2}\right) \quad \text{(Equation 6)}$$

$$y = \pm b \sqrt{r^2 - \left(\frac{x^2}{a^2}\right)} \quad \text{(Equation 7)}$$

$$y = \pm b \sqrt{r^2 - x^2} \quad \text{(Equation 8)}$$

where r is an arbitrary value, b is an arbitrary value from zero, and x ranges −r to r.

Figure 7B:
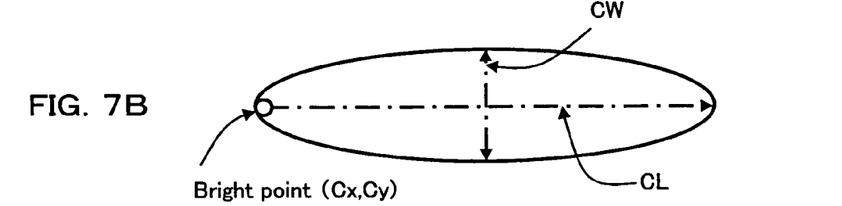
FIG. 7B is an explanatory view of generating a bright line.
Figure 7C:
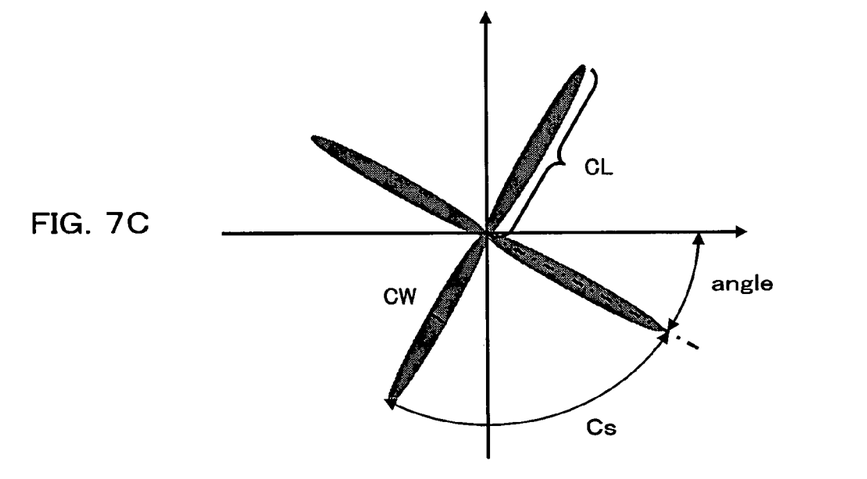
FIG. 7C is an explanatory view of generating a bright line.

As shown in FIGS. 7B and 7C, the oval having the long axis arranged parallel with the x axis is provided as a reference bright line where the lengthwise rate CL determined by the operator is based on 200% of the total number of pixels H so that the bright line extending in opposite directions from the bright point has a length determined shorter than the width of the image to be processed while the widthwise rate CW is varied from 0 to 100. The length L and the width W calculated from the number of pixels are expressed by Equations 9 and 10 respectively. When the widthwise rate CW is 100, the shape is a true circle. Accordingly, Equation 8 is shifted to Equation 11 using the length L and the width W.

$$L(=r) = \frac{H}{2} \times \frac{CL}{100} \quad \text{(Equation 9)}$$

$$W = \frac{CW}{100} \quad \text{(Equation 10)}$$

$$y = \pm W \sqrt{L^2 - x^2} \quad \text{(Equation 11)}$$

where x ranges from −L to L.

Equation 11 denotes an oval of which the center is at the origin. The oval is then shifted using Equation 12 so that the bright point locates at the left end of the long axis as shown in FIG. 7B and tinted throughout the area with a preliminary color data (S31).

$$x2 = x + L \quad \text{(Equation 12)}$$

For producing a natural form of the bright line, the brightness is attenuated as departs from the bright point. This is implemented by determining the attenuation rate G denoted by Equation 13. More specifically, the attenuation rate G1 is determined on the distance d between the bright point (0,0) and a reference point (x2,y2) in the bright line. Then, the attenuation rate G2 along the widthwise direction is calculated with y2 ranging from −y to y. Their product is thus the final attenuation rate G.

$$d = \sqrt{((x2)^2 + (y2)^2)} \quad \text{(Equation 13)}$$

$$G1 = \frac{L-d}{2 \times L} + 0.5$$

$$G2 = \frac{y - |y2|}{y}$$

$$G = G1 \times G2$$

The cross filter effect appears a radially extending pattern of the bright line with the bright point at the center. The angle Cs between any adjacent two of an Cn number of the bright lines throughout 360 degrees about the bright point is determined using Equation 14 (S33). The angle is varied in steps of 0.1 degree.

$$Cs = 3600/Cn \quad \text{(Equation 14)}$$

For producing a desired number of the bright lines determined by Equation 8, the angle from the x axis is calculated as a radian from the start angle Cs of the bright line and the angle Cs between any two adjacent bright lines as denoted by Equation 15. Then, as the coordinate (x2,y2) is turned through the angle (angle), the bright line is shifted to the center coordinate (Xc,Yc) to determine the location (xx',yy') for plotting the bright line (S34). It is noted that xx and yy are divided by 2. Since the bright line is calculated at every 0.5 pixel, any blank in the coloring can be eliminated.

$$\text{angle} = \frac{\left(Ca + \frac{Cs \times (n-1)}{10}\right)\pi}{180} \quad (n = 1, 2, \ldots, Cn) \quad \text{(Equation 15)}$$

$$\begin{pmatrix} xx \\ yy \end{pmatrix} = \begin{pmatrix} \cos(\text{angle}) & -\sin(\text{angle}) \\ \sin(\text{angle}) & \cos(\text{angle}) \end{pmatrix} \begin{pmatrix} x2 \\ y2 \end{pmatrix}$$

$$xx' = Xc + \left(\frac{xx}{2} + 0.5\right)$$

$$yy' = Yc + \left(\frac{yy}{2} + 0.5\right)$$

As described, the image of the bright line is generated and the data of pixels at the bright points are produced by the second bright line plot processing means (S35). When the pixel at the bright point (Cx,Cy) in this main-scan image stored in the main-scanned image memory 32B is expressed by (r,g,b), the luminance D1 is calculated from Equation 16.

$$D1 = (r+g+b)/3 \quad \text{(Equation 16)}$$

The luminance is shifted while the color balancing remains unchanged at the luminance D of the bright point, determined by Equation 1, in the pre-scanned image stored in the image processing condition determining unit 37. The pixel data (rc,gc,bc) and its luminance Dc are calculated using Equation 17. Also, the color of the bright point is determined from Equation 18 with the cross pattern variable Cp (entered by the operator) using the pixel data (rc,gc,bc) or the white pixel data (Dc,Dc,Dc).

$$rc = (r - D1) + D$$

$$gc = (g - D1) + D$$

$$bc = (b - D1) + D$$

$$Dc = (rc + gc + bc)/3 \qquad \text{(Equation 17)}$$

$$\text{if } Cp = 0 \text{ then}(rc, gc, bc), \text{else}(Dc, Dc, Dc) \qquad \text{(Equation 18)}$$

This is followed by the third bright line plot processing means generating data of the pixels for the bright line from the pixel data produced by attenuating the data of the pixel at the bright point at the attenuation rate along the lengthwise and widthwise directions of the bright line and the pixel data of the image to be processed (S36).

More specifically, the pixel data (ra,ga,ba) is calculated from Equation 19 using the pixel data (ro,go,bo) at the coordinate (xx',yy') determined by Equation 15 and the pixel data (rc,gc,bc) determined by Equation 18 (when the cross pattern variable Cp is zero) at the attenuation rate G determined by Equation 13. When the pixel data (ra,ga,ba) is smaller than the pixel data (ro,go,bo) as denoted by Equation 20, it is determined that the original pixel data is used at each color.

$$ra = rc \times G + ro \times (1-G)$$

$$ga = gc \times G + go \times (1-G)$$

$$ba = bc \times G + bo \times (1-G) \qquad \text{(Equation 19)}$$

$$\text{if}(ra < ro)\text{then}(ra = ro), \text{else}(ra)$$

$$\text{if}(ga < go)\text{then}(ga = go), \text{else}(ga)$$

$$\text{if}(ba < bo)\text{then}(ba = bo), \text{else}(ba) \qquad \text{(Equation 20)}$$

When two or more of the bright lines overlap or the pixel data of the above bright line is generated to cover the existing bright line, the original pixel data (ro,go,bo) for generating the pixel data of the bright line at the above step is replaced by the existing data so that the brightness is enhanced. The fourth bright line plot processing means replaces the pixel data (ra,ga,ba) generated by the third bright line plot processing means with the original pixel data (ro,go,bo) to produce a bright line to be plot (S37).

More particularly, the action of plotting the bright line comprises a first bright line plotting step of generating an image of the bright line, which starts from the pixel at the bright point, using a predetermined bright line definition format, a second bright line plotting step of generating data of the pixel at the bright point, a third bright line plotting step of generating data of the pixels for the bright line from the pixel data produced by attenuating the data of the pixel at the bright point at a given attenuation rate along the lengthwise and widthwise directions of the bright line and the pixel data of the image to be processed, and a fourth bright line plotting step of plotting the data of the bright line on the image to be processed.

The method of detecting the bright point is implemented by a computer program product which is stored in the ROM of the image processor 30 and used to operate the first bright line plot processing means for generating an image of the outline of the bright line using a predetermined bright line definition format, the second bright line plot processing means for generating data of the pixel at the bright point, the third bright line plot processing means for generating data of each pixel for the outline of the bright line from the pixel data produced by attenuating the data of the pixel at the bright point at a given attenuation rate along the lengthwise and/or widthwise direction of the bright line and the pixel data of the image to be processed, and the fourth bright line plot processing means for plotting the data of the pixels for the bright line on the image to be processed.

As described above, the procedure starts with generating an image of the bright line, which starts from the pixel at the bright point, using a given bright line definition format and determining a value for providing the desired spectacular effect which selects the use of either white color pixels or bright point pixels. The third bright line plotting step generates data of each pixel for the bright line from the pixel data produced by attenuating the data of the pixel at the bright point at a given attenuation rate along the lengthwise and/or widthwise direction of the bright line and the pixel data of the image to be processed. This allows the bright line to be gradually declined in the luminance as departing length wisely from the bright point and widthwisely from the center. As a result, the bright line appears in a natural form enhancing the original image.

The bright line plot definition format preferably employs an oval form of which the long axis starts from one bright point. Because of a variety of the bright line definition data including the long and short axes of the oval, the number of the bright lines, and the angle of starting the bright line and arbitrarily entered at the input step, the bright lines can be characterized with sharpness, softness, or any other spectacular feature thus producing a natural mode of the cross filter effect with ease.

Figure 7D:
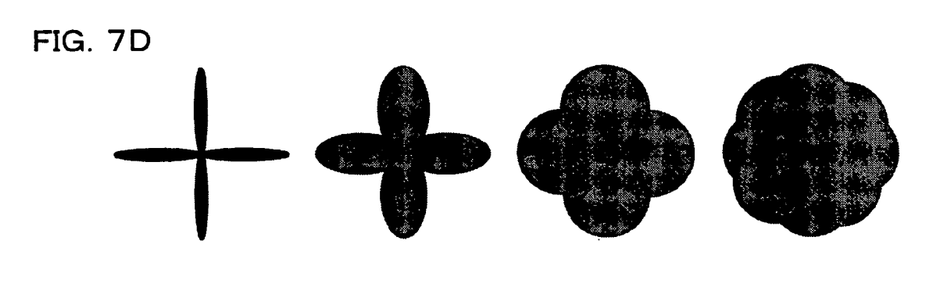
FIG. 7D is an explanatory view showing modifications of the bright line to be generated.

According to the present invention, a natural mode of the cross filter effect can be applied to any existing digital photographic image. Also, as shown at right in FIG. 7D, the soft filter effect in addition to the cross filter effect can be implemented with desired settings of the lengthwise rate CL, the widthwise rate CW, and the number of the bright lines.

Figure 8A:
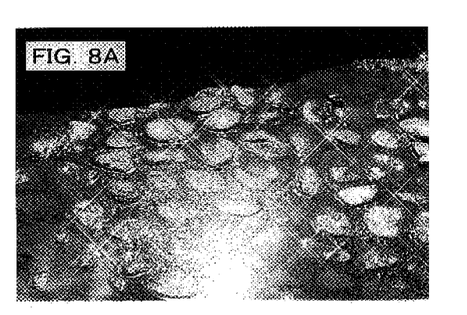
FIG. 8A is an explanatory view of an image sample produced by a conventional bright line plot processing method.
Figure 8B:
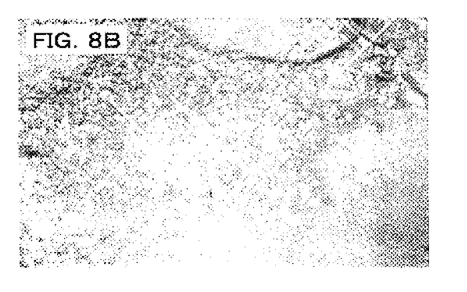
FIG. 8B is an explanatory view of an image sample produced by a conventional bright line plot processing method.
Figure 8C:
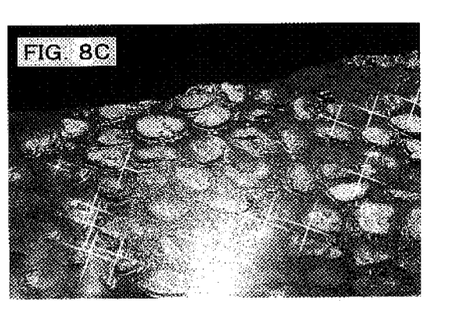
FIG. 8C is an explanatory view of an image sample produced by the bright line plot processing method of the present invention as compared with FIG. 8A.
Figure 8D:
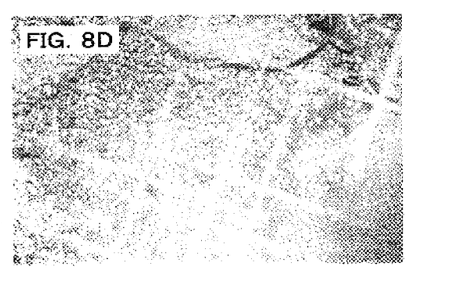
FIG. 8D is an explanatory view of an image sample produced by the bright line plot processing method of the present invention as compared with FIG. 8B.
Figure 9A:
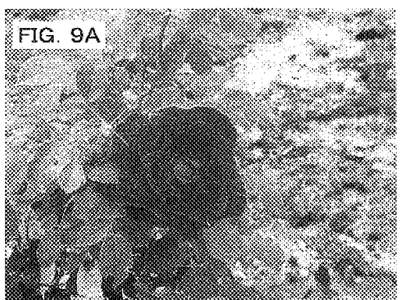
FIG. 9A is an explanatory view of an image sample produced by a conventional bright line plot processing method.
Figure 9B:
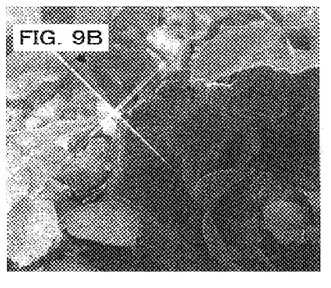
FIG. 9B is an explanatory view of an image sample produced by a conventional bright line plot processing method.
Figure 9C:
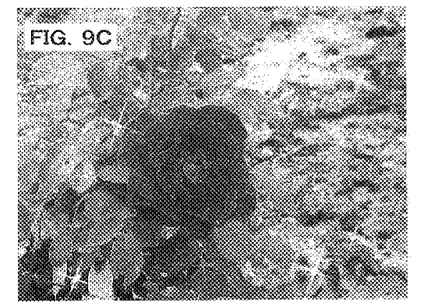
FIG. 9C is an explanatory view of an image sample produced by the bright line plot processing method of the present invention as compared with FIG. 9A.
Figure 9D:
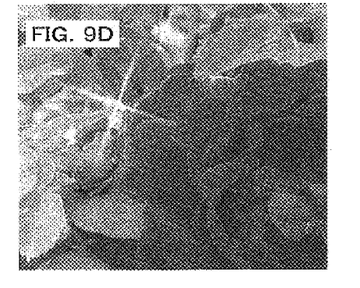
FIG. 9D is an explanatory view of an image sample produced by the bright line plot processing method of the present invention as compared with FIG. 9B.

The conventional bright line plot processing method permits the bright line to be plotted simply in a linear form with zigzag outlines as shown in FIG. 8A and its enlargement of FIG. 8B. The bright line plot processing method of the present invention can however produce a more natural cross filter effect where the bright line is gradually attenuated in the luminance along the lengthwise and widthwise directions, as shown in FIG. 8C and its enlargement of FIG. 8D. Also, the bright line plotted by the conventional bright line plot processing method is linear and has a mechanical appearance, as shown in FIG. 9A and its enlargement of FIG. 9B. However, the bright line plotted by the method of the present invention exhibit a more natural cross filter effect where the bright points are clearly identified, as shown in FIG. 9C and its enlargement of FIG. 9D.

Other embodiments of the present invention will be described. In the above-described embodiment, the action of detecting the bright point is applied to images read at low resolution from a photographic film. The action of plotting the bright line is applied to the images read at high resolution from the photographic film. The present invention is not limited to the previous embodiment and may allow both actions of detecting the bright point and plotting the bright line to be applied to images read at high resolution from a photographic film.

While the above embodiment is described with an oval form of the bright line which starts from the bright point, the present invention is not limited to the oval form plotted by starting from the bright point and may be applied to any appropriate shape such as a straight line or a diamond. Equally, as the bright line is gradually attenuated in the luminance along the lengthwise direction and the widthwise direction from the center of the bright line, the cross filter effect can be emphasized in the spontaneity.

In the above embodiment, the third bright line plot processing means is arranged to generate data of each pixel for the bright line from the pixel data produced by attenuating the data of the pixel at the bright point at a predetermined attenuation rate along the lengthwise and widthwise directions of the bright line and the pixel data of the image to be processed. Alternatively, data of each pixel for the bright line can be generated from the pixel data produced by attenuating the data of the pixel at the bright point at a predetermined attenuation rate along either the lengthwise or widthwise direction of the bright line and the pixel data of the image to be processed. The latter case will also produce an equal effect.

The action of detecting the bright point described above is illustrative and not of limitation according to the present invention.

Although its previous embodiment produces a cross filter effect on images recorded on a photographic film, the present invention may be applied with equal success to digital images shot by a digital camera. In the latter case, the image processor is equipped with an interface circuit for connection with a digital camera or a hand-held memory chip in which images shot by a digital camera are stored to receive data of the images to be processed.

While the above embodiment illustrates the photograph processor as one example of the image processor, its plot processing unit may be a common computer controlled by a known OS program or equipped with a hard disk which is controlled by a known OS program and in which a computer program product for carrying out the action of plotting the bright line is installed. The computer program product may favorably be stored in a portable recording medium such as CD-R.

As described above, the present invention provides the bright line plot processing method and the computer program product for conducting the bright line plot processing method in which a more natural mode of the cross filter effect can be applied to the digital images produced by the digital camera or read by the scanner scanning the photographic film or the like.

What is claimed is:

1. A bright line plot processing method of plotting a bright line which starts from a pixel at a bright point in a predetermined area of an image to be processed, comprising the steps of:
    a first bright line plotting step of generating an image of the bright line from preliminary data of a pixel using a predetermined bright line definition format;
    a second bright line plotting step of setting either one of data of the pixel at the bright point of the image to be processed or data of a white pixel corresponding to a luminance of the bright point as data of the pixel at a starting point of the bright line;
    a third bright line plotting step of calculating data of each pixel in an area where the image of the bright line is plotted by performing weighting addition of 1) the data of each pixel corresponding to the area where the image of the bright line in the image to be processed is plotted and 2) the data of the pixel at the starting point of the bright line at an attenuation rate, where a predetermined attenuation rate is applied to at least one of the pixel positioned farther from the starting point of the bright line in a lengthwise direction along a center line and the pixel position farther in respective widthwise directions; and
    a fourth bright line plotting step of plotting the bright line on the image to be processed on a basis of the data of the pixels for the bright line calculated in said third bright line plotting step.

2. The bright line plot processing method according to claim 1, wherein the bright line definition format involves an equation defining an oval, of which the starting point is located on one end of a major axis, and said first bright line plotting step includes an input step of entering data for defining the bright line including lengths in the major and minor axes of the oval, a number of bright lines, and an angle of starting the bright line corresponding to a horizontal direction.

3. The bright line plot processing method according to claim 1, wherein when the data of the pixels for a bright line has been calculated in an area where a plurality of images of the bright lines to be plotted on the image to be processed are overlapped with each other, said third bright line plotting step utilizes a value calculated from the data of the pixels for the bright line as the data of the pixels for another bright line.

4. The bright line plot processing method according to claim 1, wherein when a value calculated as the data of each pixel in the area where the image of the bright line is plotted is smaller than the value of the pixel in the image to be processed, said third bright line plotting step utilizes the data of the pixels in the image to be processed as data of the pixel in the area where the image of the bright line is plotted.

5. A computer-readable medium including a computer program for conducting the bright line plot processing to provide a natural cross filter effect on an image to be processed, comprising:
    a first bright line plot processing means for generating an image of a bright line from preliminary data of a pixel using a predetermined bright line definition format;
    a second bright line plot processing means for setting either one of data of the pixel at the bright point of the image to be processed or data of a white pixel corresponding to a luminance of the bright point as data of the pixel at a starting point of the bright line;
    a third bright line plot processing means for calculating data of each pixel in an area where the image of the bright line is plotted by performing weighting addition of 1) the data of each pixel corresponding to the area where the image of the bright line in the image to be processed is plotted and 2) the data of the pixel at the starting point of the bright line at an attenuation rate, where a predetermined attenuation rate is applied to at least one of the pixel positioned farther from the starting point of the bright line in a lengthwise direction along a center line and the pixel positioned farther in respective widthwise directions; and
    a fourth bright line plot processing means for plotting the bright line on the image to be processed on a basis of the data of the pixels for the bright line calculated in said third bright line plot processing means.

6. The computer-readable medium according to claim 5, wherein the bright line definition format involves an equation defining an oval, of which the starting point is located on one end of a major axis, and said first bright line plot processing means includes an input processing means for entering data for defining the bright line including lengths in the major and minor axes of the oval, a number of bright lines, and an angle of starting the bright line corresponding to a horizontal direction.

7. The computer-readable medium according to claim 5, wherein when the data of the pixels for a bright line has been calculated in an area where a plurality of images of the bright lines to be plotted on the image to be processed are overlapped with each other, said third bright line plot processing means utilizes the value calculated from the data of the pixels for the bright line as the data of the pixels for another bright line.

8. A bright line plot processing apparatus comprising:

a first bright line plot processing means for generating an image of a bright line from preliminary data of a pixel using a predetermined bright line definition format;

a second bright line plot processing means for setting either one of data of the pixel at the bright point of the image to be processed or data of a white pixel corresponding to a luminance of the bright point as data of the pixel at a starting point of the bright line;

a third bright line plot processing means for calculating data of each pixel in an area where the image of the bright line is plotted by performing weighting addition of 1) the data of each pixel corresponding to the area where the image of the bright line in the image to be processed is plotted and 2) the data of the pixel at the starting point of the bright line at an attenuation rate, where a predetermined attenuation rate is applied to at least one of the pixel positioned farther from the starting point of the bright line in a lengthwise direction along a center line and the pixel positioned farther in respective widthwise directions; and a fourth bright line plot processing means for plotting the bright line on the image to be processed on a basis of the data of the pixels for the bright line calculated in said third bright line plot processing means.

9. The bright line plot processing apparatus according to claim 8, wherein the bright line definition format involves an equation defining an oval, of which the starting point is located on one end of a major axis, and said first bright line plot processing means includes an input processing means for entering data for defining the bright line including lengths in the major and minor axes of the oval, a number of bright lines, and an angle of starting the bright line corresponding to horizontal direction.

10. The bright line plot processing apparatus according to claim 8, wherein when the data of the pixels for a bright line has been calculated in an area where a plurality of images of the bright lines to be plotted on the image to be processed are overlapped with each other, said third bright line plot processing means utilizes a value calculated from the data of the pixels for the bright line as the data of the pixels for another bright line.

* * * * *